United States Patent [19]
Kämmerer et al.

[11] 4,122,244
[45] Oct. 24, 1978

[54] ELECTRIC STORAGE BATTERY

[75] Inventors: Gerhard Kämmerer, Eilvese; Friedrich Bohne, Springe, both of Fed. Rep. of Germany

[73] Assignee: Varta Batterie Aktiengesellschaft, Fed. Rep. of Germany

[21] Appl. No.: 825,489

[22] Filed: Aug. 17, 1977

[30] Foreign Application Priority Data

Aug. 21, 1976 [DE] Fed. Rep. of Germany ....... 7626233

[51] Int. Cl.² .......................................... H01M 10/16
[52] U.S. Cl. .................................. 429/186; 429/208; 29/623.2

[58] Field of Search .......................... 429/186, 96–100, 429/208; 29/623.2, 623.1

[56] References Cited

U.S. PATENT DOCUMENTS

| 1,874,404 | 8/1932 | Wood ............................ 429/186 X |
| 1,957,342 | 5/1934 | Huntsberger ..................... 429/186 |
| 1,992,817 | 2/1935 | Dunzweiler ..................... 429/186 X |
| 3,909,294 | 9/1975 | Kosuge et al. ................... 429/186 X |

*Primary Examiner*—Anthony Skapars
*Attorney, Agent, or Firm*—Weiser, Stapler & Spivak

[57] ABSTRACT

A synthetic plastic insert is attached to the top of the plate block and bears against the cell lid.

14 Claims, 5 Drawing Figures

ELECTRIC STORAGE BATTERY

The present improvement relates to an electric storage battery whose plate block consists of positive and negative electrodes as well as separators and is contained in a block case having a lid.

In electric storage batteries, and particularly in lead storage batteries, the plate blocks consist of positive and negative electrode plates superposed in layers with intervening separators. The electrodes of one polarity are each connected to a pole bridge by means of their plate lugs which may be produced, for example, by casting liquid lead in a form around the plate lugs. In a multi-cell storage battery the pole bridges of adjacent cells are connected to each other by means of cell connectors. Particularly in starter batteries, these pass through the cell separating partitions of the multi-cell container or block case. This block case may consist, for example, of thin wall polypropylene since such multi-cell storage batteries are used in vehicles, they must have high vibration resistance. A large fraction of the losses during vibration testing is attributable to damage in the region of the connection between pole bridge and plate lugs. During vibration of the batteries individual plates then move upwardly and create a short-circuit with the pole bridge of the opposite polarity. Alternatively, there take place displacements of the entire plate block, causing rupture of the cell connector.

Accordingly, it is an object of the present improvement to provide a battery with special precautions by means of which the vibration resistance is materially enhanced.

It is another object to provide such measures which can be used in mass production without incurring high costs.

These and other objects which will appear are achieved in accordance with the present improvement by providing between the lid and the upper surface of the plate block a synthetic plastic insert which, on the one hand, is permanently attached to the upper surface of the plate block while, on the other hand, it bears against the lid of the block case.

In addition, the synthetic plastic insert can be glued, particularly to the upper surface of the plate block and it can be guided and positioned against the cell partition or the end wall of the block case, as the case may be, by such means as a groove/spring-like connection.

For further details, reference is made to the discussion which follows in the light of the accompanying drawings wherein.

The same reference numerals designate similar elements in the several figures.

Figure 1:
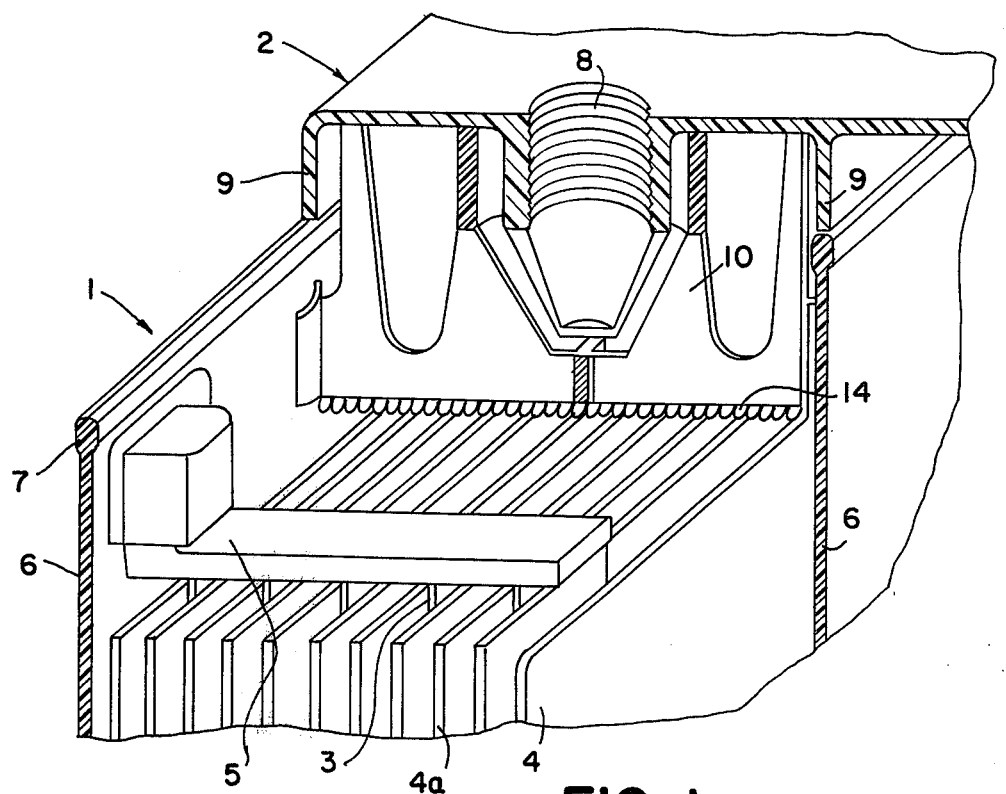
FIG. 1 is an overall view, with portions broken away for improved visibility of the interior, of a fragment of a battery embodying the present invention.

FIG. 1, to which reference may now be had, shows a block case 1 which may contain, for example, multiple cells and which is provided with a matchingly-shaped lid 2, a plate block of positive electrodes 3, of which only the plate lugs are visible, and negative electrodes 4 between which separators 4a are positioned. The plates of each polarity are, in each case, connected by a pole bridge 5 which leads through the separating partition 6 between adjacent cells. The upper rim of cell separating partition 6 is provided with a reinforcement 7 which facilitates the welding on of cell lid 2 by means of mirror welding. The block case lid 2 has corresponding separating partitions 9 and a conventional filler opening 8 is provided for each cell.

Figure 1A:
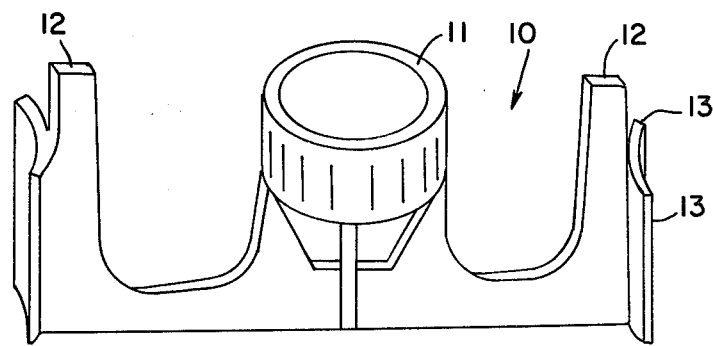
FIG. 1a shows an embodiment of an insert embodying the present invention.

In accordance with the present improvement there is attached to the plate block the insert 10 illustrated in FIG. 1a. This insert 10 is a molded synthetic plastic part, preferably of polypropylene or polystyrol. Its length corresponds to the width of the plate block and in its middle there is a molded-on hollow cylinder 11 which fits over the portion of filler opening 8 which protrudes into the interior of the cell. On both sides, insert 10 has supports 12 which, when the insert is in its intended position, rest against the inner top surface of lid 12, as does also hollow cylinder 11. On its sides the insert is preferably provided with elastic protrusions 13 which create a clamping effect. In addition, the insert is glued to, i.e. permanently attached to the plate block by application of an adhesive strip. For example, there may be applied to the plate block in the middle between the pole bridges a casting of an atactic polypropylene or polyurethane. The insert 10 is then pressed into this and the cast body 14 thereupon produces a firm connection between the electrode plates and insert 10 after hardening. Before hardening, the lid is attached by conventional mirror welding process. Since the insert 10 bears upon lid 2, there is also produced a firm connection between the plate block and the lid after hardening of the casting. Because of the presence of casting 14, it is possible to compensate for variations in height tolerances or play between the upper edge of the plate block and the height of the block case, which are unavoidable during manufacture.

Figure 2:
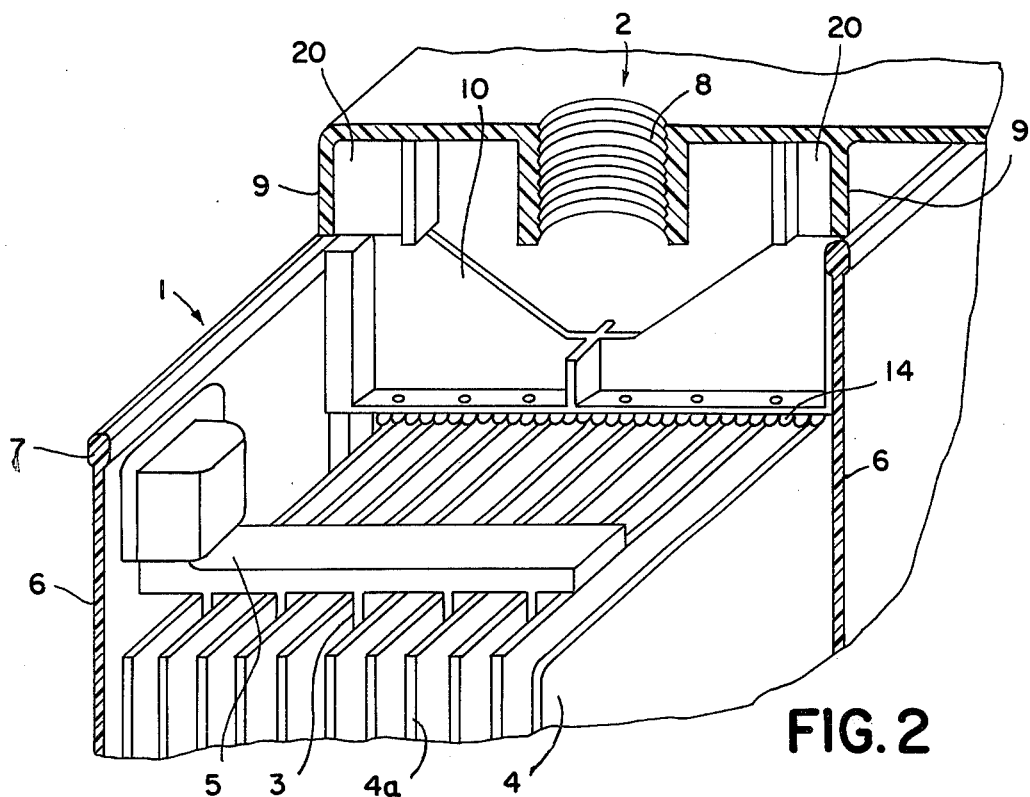
FIG. 2 shows an alternative embodiment of a battery in accordance with the present improvement.
Figures 2A, 2B:
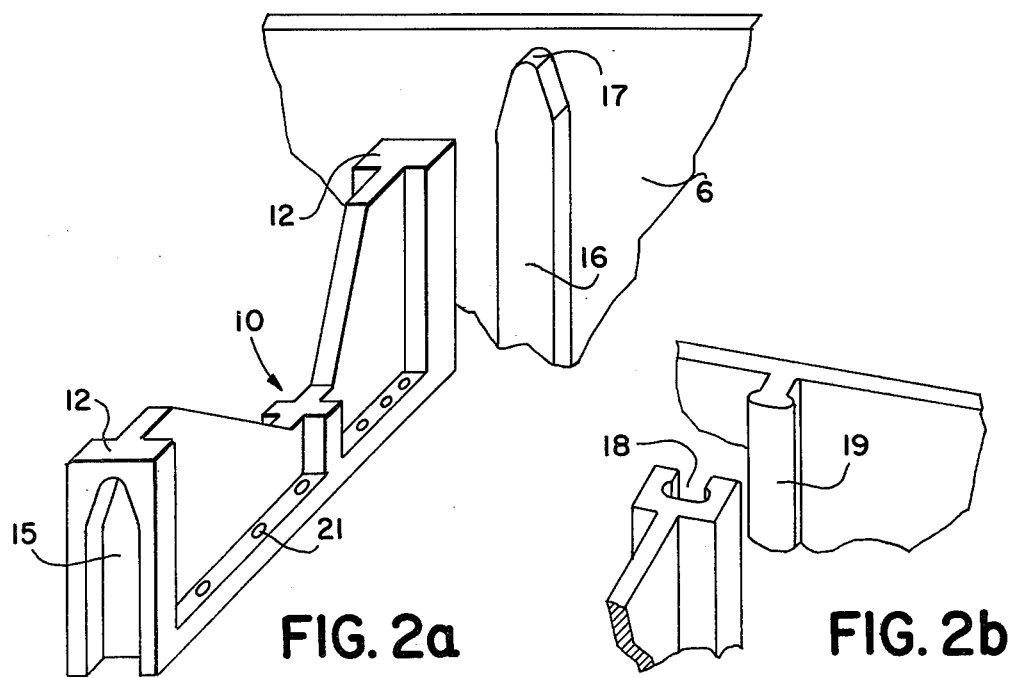
FIGS. 2a and 2b show details of alternative embodiments of portions of the battery of FIG. 2.

In accordance with FIG. 2, to which reference may now be had, the bearing of the insert 10 is not against the inside of the lid, but rather against the plane of the welding seam between case and lid which is formed during welding of the lid to the case. Here, too, a cast strip 14 is placed across the plate block, into which the insert 10 is pressed as shown in FIG. 2a. At both of its lateral supports 12 the insert has guidance grooves 15, or 18 in the case of FIG. 2b. These correspond to conforming protrusions 16, or 19 for FIG. 2b, on the cell separating partition 6 or the block case end wall, as the case may be. The groove/spring-like connection between insert 10 and block case end wall 16 may, as illustrated in FIG. 2a, take the form of a rectangular protrusion 16 from cell separating partition 6 and a corresponding groove 15 in insert 10. Naturally, it is also possible, as is illustrated in FIG. 2b, to give to the protrusion from the cell separating partition 6 what may, for example, be a swallow-tail shaped configuration 19. The seat between the protrusions from the cell separating partition and the corresponding recess in the insert is so shaped that withdrawal of the insert 10 after mirror welding of case and lid is no longer feasible. The insert and/or the rib on the case end wall is, as shown at 17 in FIG. 2a, preferably provided with a stop which insures that the upper edge of the insert is in the same plane as the upper edge of the block case. If there is play (tolerance) between the plate block when in position and the upper edge of the block case, this is compensated for by casting 14. The underside of lid 2 has T-shaped bearing members 20 formed in the area of insert 10, by means of which reliable bearing of insert 10 against lid 2 following the welding process is assured. Through welding of block case 1 and lid 2 the insert 10 is simultaneously welded to lid 2. The bottom of the insert may be provided with apertures 21 into which a portion of the casting can penetrate so that, after welding, a reliable and firm connection is established between plate block, insert and lid.

We claim:

1. An electric storage battery having a plate block comprising positive and negative electrodes and separators positioned in a block case with a lid, the battery comprising:

a synthetic plastic insert positioned between the lid and the top of the plate block, the insert being permanently attached at one end to the top of the plate block and bearing at the other end against the lid of the block case, the attachment of the insert to the top of the plate block being by means of an adhesive strip interposed between the insert and the plate block and compensating by its presence for variations in height tolerances or play between the top of the plate block and the height of the block case.

2. The battery of claim 1 further comprising groove/spring-like connecting members guiding and positioning the synthetic plastic insert against a cell partition or block case end wall.

3. The battery of claim 1 wherein the insert extends above the plate block up to the edge of the block case, and the lid is provided with support ribs resting upon the insert and the lid is welded to the insert.

4. The battery of claim 3 wherein the bottom of the insert is provided with apertures through which adhesive can penetrate and provide a firm connection between the top of the plate block and the insert.

5. The battery of claim 2 wherein the connectors include vertically extending protrusions from the battery wall and matching grooves in the ends of the insert.

6. The battery of claim 5 wherein the protrusions from the battery walls are swallowtail shaped.

7. The battery of claim 1 wherein the adhesive strip is a casting applied to the plate block before the insert, and into which the insert is then pressed before the casting hardens, thereby enabling the casting to provide the said compensating for tolerances or play.

8. The battery of claim 7 wherein the edge of the insert adjacent the plate block is substantially flat across the width of the plate block, and the casting forming the adhesive strip is also substantially flat before the insert is pressed into it.

9. The battery of claim 8 wherein the casting assumes a scalloped configuration conforming to the top of the plates after the insert is pressed into it.

10. The battery of claim 9 wherein the edge of the insert adjacent the plate block has a ledge paralleling the plate block top, and apertures in the ledge to enable material of the casting to penetrate upwardly into the apertures when the insert is pressed into the casting.

11. The battery of claim 10 wherein means are provided bearing downwardly on the insert at the plane of the welding seam between block case and lid.

12. The battery of claim 11 wherein the seam is welded by mirror welding.

13. An electric storage battery having a plate block comprising positive and negative electrodes and separators positioned in a block case with a lid, the battery being made by a process comprising the steps of:

placing across the top of the plate block an adhesive strip consisting of an unhardened casting, positioning a synthetic plastic insert on top of the casting and pressing the insert into the casting to produce a firm connection between the plate block and the insert after casting hardening, and attaching the lid to the block case before hardening of the casting, so as to bear upon the insert, whereby the casting compensates for variations in height tolerances or play between the upper edge of the plate block and the height of the block case.

14. The battery of claim 13 wherein the casting is of an atactic polypropylene or polyurethane.

* * * * *